April 17, 1956 — L. SEITZ — 2,741,933

CONNECTING ROD

Filed March 26, 1952

INVENTOR
LUDWIG SEITZ

BY Marechal Biebel French & Bugg
ATTORNEYS

United States Patent Office 2,741,933
Patented Apr. 17, 1956

2,741,933

CONNECTING ROD

Ludwig Seitz, Augsburg, Germany, assignor to Maschinenfabrik Augsburg-Nurnberg A. G., Augsburg, Germany, a corporation of Germany Application March 26, 1952, Serial No. 278,560

Claims priority, application Germany March 31, 1951

8 Claims. (Cl. 74—579)

This invention relates to certain improvements in the connecting rod of internal combustion engines, more particularly, diesel engines, of the plunger type.

In such engines it was found to be advantageous, for facilitating the fitting, to provide a design which permits removal of the piston and the connecting rod, or introduction of said parts, through the cylinder liner on removal of the cap of the bi-partite connecting rod end. To this end, the outer dimensions of the cap of the connecting rod end must be somewhat smaller than the diameter of the cylinder liner. On the other hand, it is desirable for various reasons to make the diameter of the crank-pin as large as possible, so as to ensure that possible resonance frequencies of the crank shaft are above the normal speed, or in order to adapt its dimensions to the specifications for acceptance issued by the various classification companies, or for reasons of mechanical strength, in order to ensure that the big end bearing will safely stand up in permanent working order to the increased stresses occurring by the increased ignition pressures which are automatically resulting by the supercharging of internal combustion engines.

It is the object of the present invention to provide a simple and reliable design of a connecting rod adapted to accommodate a crank pin of maximum diameter.

With this and further objects in view, according to the present invention the cap of the connecting rod end is forged in one piece with its two lug-shaped extensions. Inserted in these lugs are cylindrical toothed members engaging in counter-toothings of the shank of the connecting rod and clamping the two members fixedly together by means of a threaded through-bolt. A special advantage of this construction consists in the favorable course of the flux of force which is transmitted to the big end bearing without sharp deflections from the shank through the toothed members and the lug-shaped extensions.

Other and further objects, features and advantages of the invention will be pointed out hereinafter and appear in the appended claims forming part of the application.

In the accompanying drawings a now preferred embodiment of the invention is shown by way of illustration and not by way of limitation.

Figure 1:
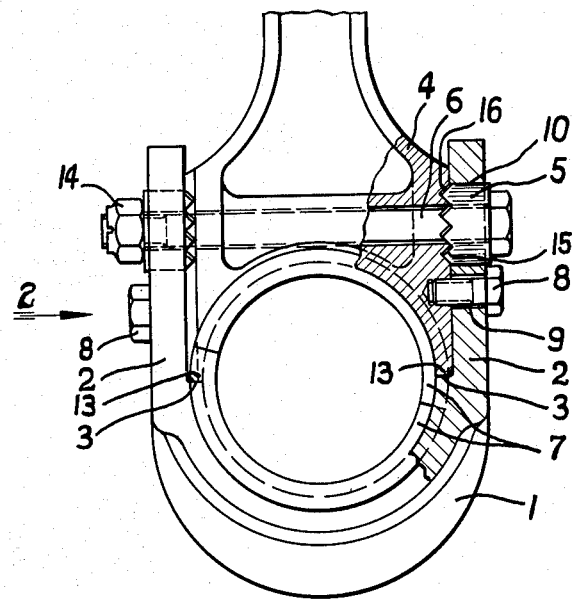
Figure 2:
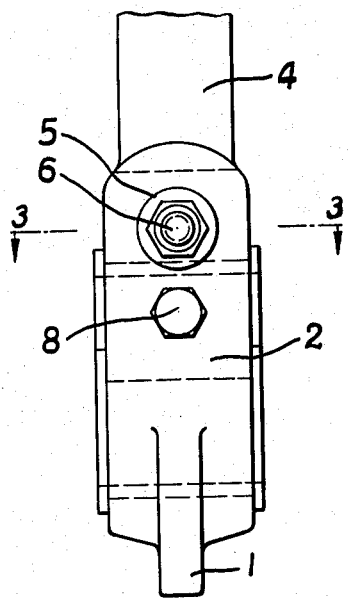
Figure 3:
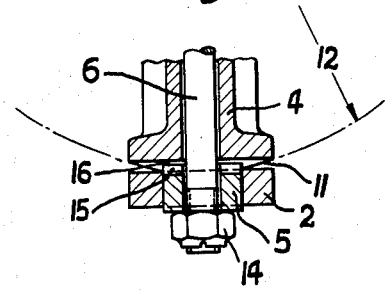

Fig. 1 is a front elevation, partly in section, of the cap of the connecting rod end and the big end of the connecting rod shank, Fig. 2 is a side view thereof, and Fig. 3 is a section on line III—III of Fig. 2.

Referring to the drawing, it will be seen that the cap 1 of the connecting rod end is forged in one piece with its two lug-shaped extensions 2 and formed with a shoulder 3 on each side in the middle plane of the crank pin, for engagement of the end faces 13 of the shank 4 of the connecting rod. Inserted in holes 10 the lug-shaped extensions 2 of member 1 are cylindrical clamping members 5 provided with axial bores and with a straight transverse toothing 15 on their inner faces engaging with a corresponding toothing 16 of the big end 4 of the connecting rod which latter toothing, however, is displaced by a small amount in the direction towards the shank of the rod. The clamping members 5 and the big end 4 of the connecting rod are traversed by a threaded bolt 6 threadably engaged with a nut 14 by tightening of which the toothed clamping bodies 5 are tightly forced into the toothings 16 of the big end 4 and the end faces 13 of the latter are urged into tight engagement with the shoulders 3 of the cap 1 whereby simultaneously the bearing bushes 7 are subjected to the required bracing. It is preferred, in order to ensure a flush bearing of the lug-shaped extensions 2 on the rod 4, to provide an additional connection between the big end 4 and the lugs 2 by screws 8, after the tightening of the nut 14. The bores 9 for screws 8 moreover have a favorable effect regarding the flux of force in the lugs 2, i. e., the lines of force are gradually deflected around the larger bores 10.

In order to utilize fully the possibilities of providing a crank pin of a large diameter, the end face 11 of the connecting rod 4 is bevelled at its edges (Fig. 3) in such a way that it is substantially adapted to the internal diameter 12 of the cylinder bore (not shown). The engaged part of the toothing 16 in this case remains unaffected while the marginal parts of the toothing 16 are gradually tapered off.

While the invention has been described in detail with respect to a now preferred example and embodiment of the invention it will be understood by those skilled in the art after understanding the invention that various changes and modifications may be made without departing from the spirit and scope of the invention and it is intended, therefore, to cover all such changes and modifications in the appended claims.

What is claimed is:

1. In a connecting rod assembly for internal combustion engines having a connecting rod one end of which is adapted to be connected to a crankshaft, the combination which comprises laterally extending shoulders at said end of said connecting rod providing increased bearing area for connection to said crankshaft, toothed surfaces on said shoulders, a one piece substantially U-shaped cap member for connecting said rod to said crankshaft, lugs on said cap member embracing said shoulders on said connecting rod, clamping members in said lugs having toothed surfaces for cooperative engagement with said toothed surfaces on said shoulders, said toothed surfaces on said shoulders and said clamping members being slightly offset from each other longitudinally of said connecting rod, and means for urging said clamping members against said shoulders effecting longitudinal tensioning of said cap member against said connecting rod.

2. In a connecting rod assembly for internal combustion engines having a connecting rod one end of which is adapted to be connected to a crankshaft, the combination which comprises laterally extending shoulders at said end of said connecting rod providing increased bearing area for connection to said crankshaft, toothed surfaces on said shoulders, a one piece substantially U-shaped cap member for connecting said rod to said crankshaft, lugs on said cap member embracing said shoulders on said connecting rod, cylindrical clamping members inserted in said lugs having toothed surfaces for cooperative engagement with said toothed surfaces on said shoulders, said toothed surfaces on said shoulders and said clamping members being offset from each other longitudinally of said connecting rod, and a bolt disposed transversely through said clamping members and said connecting rod for urging said clamping members against said shoulders effecting interfitting engagement of said toothed surfaces and longitudinal tensioning of said cap member against said connecting rod.

3. In a connecting rod assembly for internal combustion engines having a connecting rod one end of which is adapted to be connected to a crankshaft, the combination which comprises laterally extending shoulders at said end of said connecting rod providing increased bearing area for connection to said crankshaft, straight transverse toothed surfaces on said shoulders, a one piece substantially U-shaped cap member for connecting said rod to said crankshaft, lugs on said cap member embracing said shoulders on said connecting rod, clamping members in said lugs having toothed surfaces for cooperative engagement with said toothed surfaces on said shoulders, and means for urging said clamping members against said shoulders effecting interfitting engagement of said toothed surfaces and longitudinal tensioning of said cap member against said connecting rod.

4. In a connecting rod assembly for internal combustion engines having a connecting rod one end of which is adapted to be connected to a crankshaft, the combination which comprises laterally extending shoulders at said end of said connecting rod providing increased bearing area for connection to said crankshaft, toothed surfaces on said shoulders, a one piece substantially U-shaped cap member for connecting said rod to said crankshaft, lugs on said cap member embracing said shoulders on said connecting rod, clamping members in said lugs having toothed surfaces for cooperative engagement with said toothed surfaces on said shoulders, and a bolt disposed transversely through said shoulders and said clamping members for urging said clamping members against said shoulders effecting interfitting engagement of said toothed surfaces, said toothed surfaces on said shoulders being displaced longitudinally of said connecting rod with respect to said toothed surfaces on said clamping members for urging said cap in tension against said connecting rod upon tightening said bolt.

5. In a connecting rod assembly for internal combustion engines having a cylinder and a connecting rod one end of which is adapted to be connected to a crankshaft, the combination which comprises laterally extending shoulders at said end of said connecting rod providing increased bearing area for connection to said crankshaft, toothed surfaces on said shoulders, the greatest transverse dimension of said connecting rod including said shoulders being substantially as great as the diameter of said cylinder, a one piece substantially U-shaped cap member for connecting said rod to said crankshaft, lugs on said cap member embracing said shoulders on said connecting rod, clamping members in said lugs having toothed surfaces for cooperative engagement with said toothed surfaces on said shoulders, and means for urging said clamping members against said shoulders effecting interfitting engagement of said toothed surfaces and longitudinal tensioning of said cap member against said connecting rod.

6. In a connecting rod assembly for internal combustion engines having a cylinder and a connecting rod one end of which is adapted to be connected to a crankshaft, the combination which comprises laterally extending shoulders at said end of said connecting rod providing increased bearing area for connection to said crankshaft, the outer surfaces of said shoulders being curved in substantial conformance with the inner circumference of said cylinder, toothed surfaces on said shoulders, a one piece substantially U-shaped cap member for connecting said rod to said crankshaft, lugs on said cap member embracing said shoulders on said connecting rod, clamping members in said lugs having toothed surfaces for cooperative engagement with said toothed surfaces on said shoulders, and a bolt disposed through said shoulders and said clamping members for urging said clamping members against said shoulders effecting interfitting sliding engagement of said toothed surfaces and longitudinal tensioning of said cap member against said connecting rod, said toothed surfaces on said shoulders being displaced longitudinally of said connecting rod with respect to said toothed surfaces on said clamping members for urging said cap in tension against said connecting rod upon tightening said bolt.

7. In a connecting rod assembly for internal combustion engines having a connecting rod one end of which is adapted to be connected to a crankshaft, the combination which comprises laterally extending shoulders at said end of said connecting rod providing increased bearing area for connection to said crankshaft, toothed surfaces on said shoulders, a one piece substantially U-shaped cap member for connecting said rod to said crankshaft, lugs on said cap member embracing said shoulders on said connecting rod, clamping members in said lugs having toothed surfaces longitudinally offset and for cooperative engagement with said toothed surfaces on said shoulders, means for urging said clamping members against said shoulders effecting interfitting engagement of said toothed surfaces and longitudinal tensioning of said cap member against said connecting rod, and a bearing bushing clamped by said cap member against said end of said connecting rod.

8. In a connecting rod assembly for internal combustion engines having a connecting rod one end of which is adapted to form a crankshaft bearing, the combination which comprises laterally extending shoulders at said end of said connecting rod providing increased bearing area for connection to said crankshaft, toothed surfaces on said shoulders, a one piece substantially U-shaped cap member for connecting said rod to said crankshaft, lugs on said cap member embracing said shoulders on said connecting rod, clamping members in said lugs having toothed surfaces longitudinally offset from and for cooperative engagement with said toothed surfaces on said shoulders, means for urging said clamping members against said shoulders effecting interfitting engagement of said toothed surfaces and longitudinal tensioning of said cap member against said connecting rod, and auxiliary screws for joining said lugs to said shoulders, said auxiliary screws being positioned between said clamping members and the center of said crankshaft bearing for deflecting longitudinal forces from said clamping members.

References Cited in the file of this patent
UNITED STATES PATENTS

| | | |
|---|---|---|
| 1,043,495 | Wyman | Nov. 5. 1912 |
| 1,130,982 | Kinkead | Mar. 9, 1915 |
| 1,384,200 | Lochrane | July 12, 1921 |
| 1,434,143 | Patterson et al. | Oct. 31, 1922 |
| 1,831,430 | Weis | Nov. 10, 1931 |
| 2,378,686 | Carstens | June 19, 1945 |
| 2,407,928 | Herreshoff et al. | Sept. 17, 1946 |
| 2,428,602 | Yingling | Oct. 7, 1947 |
| 2,446,090 | Holloway | July 27, 1948 |